(12) United States Patent
Arunachalam et al.

(10) Patent No.: US 12,733,047 B2
(45) Date of Patent: Sep. 8, 2026

(54) PACKET CORE NETWORK (PCN) SELECTION OF COLLOCATED GATEWAYS

(71) Applicant: T-Mobile USA, Inc., Bellevue, WA (US)

(72) Inventors: Kameswaran Arunachalam, Redmond, WA (US); Rushabhkumar Patel, Newcastle, WA (US); Rahul Pal, Bellevue, WA (US); Kunal Prakash Barawkar, Bothell, WA (US); Samir Ramesh Shura, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 261 days.

(21) Appl. No.: 18/742,915

(22) Filed: Jun. 13, 2024

(65) Prior Publication Data

US 2025/0386381 A1 Dec. 18, 2025

(51) Int. Cl.
*H04W 76/10* (2018.01)
*H04W 8/04* (2009.01)
*H04W 88/16* (2009.01)

(52) U.S. Cl.
CPC ............. *H04W 76/10* (2018.02); *H04W 8/04* (2013.01); *H04W 88/16* (2013.01)

(58) Field of Classification Search
CPC ........ H04W 76/10; H04W 8/04; H04W 88/16
USPC ...................................................... 455/422.1
See application file for complete search history.

(56) References Cited

U.S. PATENT DOCUMENTS 10,893,556 B2 * 1/2021 Cho .................... H04L 12/4633
11,343,754 B2 * 5/2022 Kawasaki ............ H04W 48/14
11,785,515 B2 * 10/2023 Gambhir-Parekh ........................ H04W 36/0033 370/331
2012/0063300 A1 * 3/2012 Sahin ................... H04W 36/12 370/410
2017/0094699 A1 * 3/2017 Yang ...................... H04W 8/08
2021/0227595 A1 * 7/2021 Kuroda ................. H04W 76/10
2021/0258846 A1 * 8/2021 Suthar .................. H04W 36/12
2021/0409368 A1 * 12/2021 Bertz ..................... H04L 67/51

* cited by examiner

*Primary Examiner* — Don N Vo
(74) *Attorney, Agent, or Firm* — Lee & Hayes, P.C.

(57) ABSTRACT

Techniques for packet core network (PCN) gateway selection of collocated gateways are disclosed herein. A mobility management entity (MME) can retrieve charging characteristics (CC) information to determine whether collocated gateway selection is applicable for a UE. When collocated gateways are to be selected, the MME can configure domain name server (DNS) queries in a manner which is adapted for collocated gateway identification. Upon receipt of the DNS query, the DNS can be configured to identify collocated serving gateways (SGWs) which are each collocated with a packet gateway (PGW). The DNS can return identifications of the collocated SGWs to the MME, and the MME can use the identifications of the collocated SGWs to select a collocated SGW and a corresponding collocated PGW for use in connection with the network access for the user equipment.

20 Claims, 7 Drawing Sheets

PACKET CORE NETWORK (PCN) SELECTION OF COLLOCATED GATEWAYS

BACKGROUND

Today's cellular communications generally employ radio access networks (RANs) as well as packet core networks (PCNs). User equipment such as mobile telephones and other devices connect to a RAN, and the RAN forwards communications between the user equipment and a PCN.

PCNs may be operated by cellular communication network operators, such as T-MOBILE® and others. A PCN can manage user equipment communications, for example by serving as an intermediary between the user equipment and other network entities and endpoints, including for example other user equipment, internet services, applications and websites.

Evolved packet core (EPC) is a PCN framework for providing converged voice and data services on a fourth generation (4G) long-term evolution (LTE) cellular network. EPC comprises several network nodes which handle traffic and provide functions such as session management, mobile management, authentication and quality of service (QOS). Some of the primary nodes in EPC are the mobility management entity (MME), the serving gateway (SGW), the packet gateway (PGW), the policy and charging rules function (PCRF), and the home subscriber service (HSS).

The MME is EPC's control plane node and is located at the edge of the PCN. The MME manages user equipment session states and authenticates and tracks user equipment. The MME may communicate with a home subscriber service (HSS) node for user equipment authentication. The MME's mobility function enables user equipment to access the network. Among its other functions, the MME selects gateways such as the SGW and the PGW to enable cellular communication service for each connecting user equipment.

The SGW is a user plane node which handles user data traffic. The SGW connects to a RAN and routes internet protocol (IP) data packets through the RAN to the core network. The separation of the control plane provided by the MME and the user plane provided by the SGW usefully allows separation between user data and control/signaling data.

A PGW may also be referred to as a packet data node gateway or a packet data network gateway. The PGN serves as the interface between a PCN and other packet data IP networks, such as the Internet. The PGN may also manage QoS and allocate IP addresses to user equipment.

The PCRF supports data flow detection, policy enforcement and flow-based charging. The PCRF also manages QoS and defines charging based on user subscriptions are applicable to user equipment. The PCRF ensures that users receive services and are charged for them according to their contracts.

The HSS includes a database of subscriber information and user authentication details, as well as information for use in configuring calls and IP sessions. Multiple HSS nodes can optionally be synchronized to ensure proper cooperation and consistent function.

All the above described EPC nodes in are logical. Multiple logical nodes may optionally be collocated within a same physical node, within a same region or market area, or within a same environment such as a data center. There is a need for improved SGW and PGW selection techniques which can be usefully applied in circumstances wherein SGW and PGW nodes are collocated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
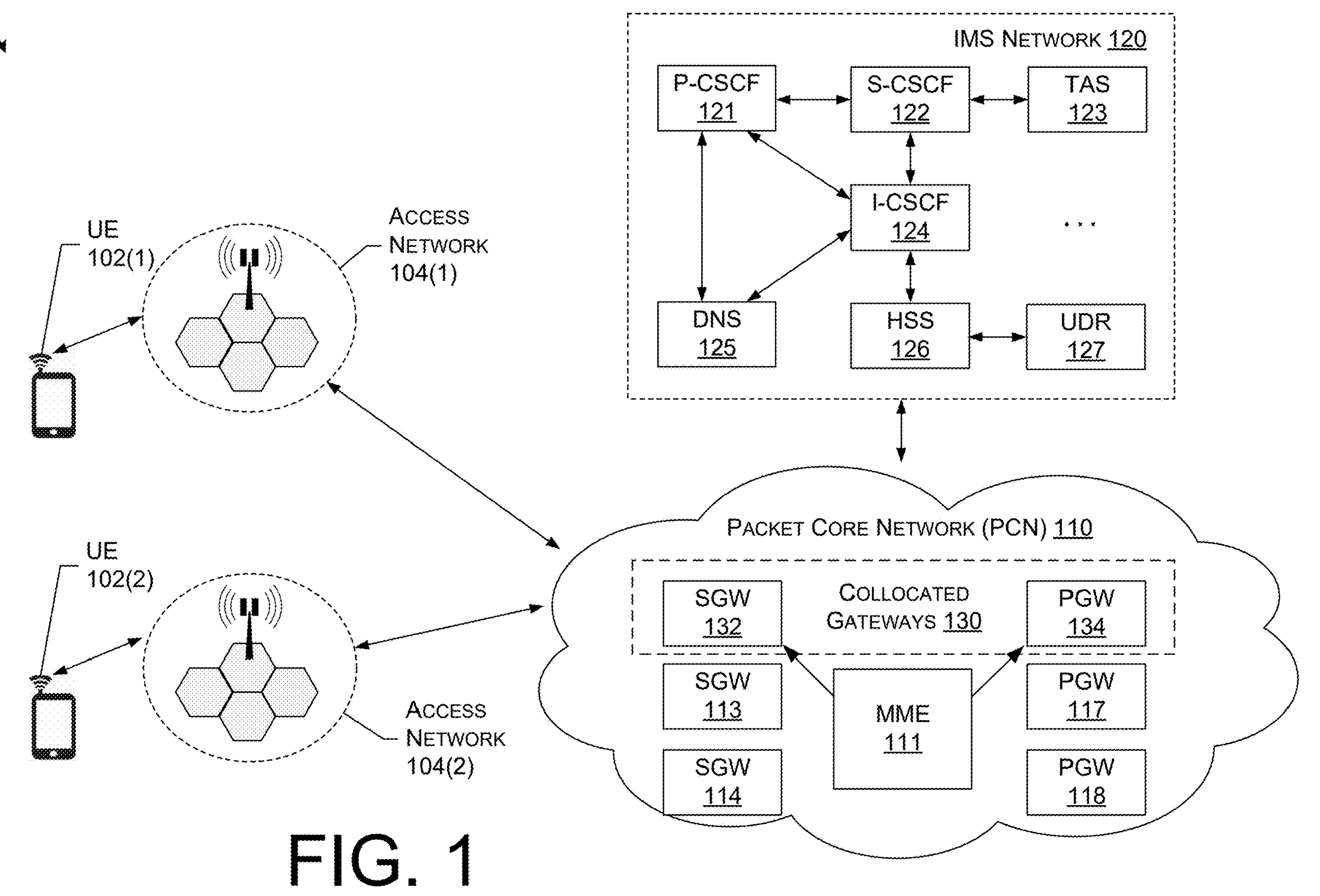
FIG. 1 illustrates an example network architecture including a packet core network (PCN) which comprises selectable gateway components, such as serving gateways (SGNs), and packet gateways (PGNs), which can be selected for use in connection with user equipment (UE) network access, according to an example of the present disclosure.

Techniques for packet core network (PCN) selection of collocated gateways are disclosed herein. PCN gateways including serving gateways (SGWs) and packet gateways (PGWs) can be selected according to the disclosed techniques to enable network access for user equipment. In response to an indication that collocated SGW and PGW can be used in connection with network service for the user equipment, a mobility management entity (MME) can configure a domain name server (DNS) query in a manner which is adapted for collocated gateway identification. The MME can retrieve and include both a tracking area code (TAC) and a charging characteristics (CC) value in the DNS query. Upon receipt of the DNS query, the DNS can be configured to identify, based on the TAC and DNS, a collocated SGW which is collocated with a PGW. The DNS can return an identification of the collocated SGW to the MME, and the MME can use the identification of the collocated SGW to select the collocated SGW as well as a collocated PGW for use in connection with the network access for the user equipment.

Techniques for packet core network (PCN) gateway selection of collocated gateways are disclosed herein. PCN gateways including serving gateways (SGWs) and packet gateways (PGWs) can be selected according to the disclosed techniques to enable network access for user equipment. A mobility management entity (MME) can retrieve charging characteristics (CC) information to determine whether collocated gateway selection is applicable for a UE. When collocated gateways are to be selected, the MME can configure domain name server (DNS) queries in a manner which is adapted for collocated gateway identification. Upon receipt of the DNS query, the DNS can be configured to identify collocated SGWs which are each collocated with a PGW. The DNS can return identifications of the collocated SGWs to the MME, and the MME can use the identifications of the collocated SGWs to select a collocated SGW and a corresponding collocated PGW for use in connection with the network access for the user equipment.

Gateway selection techniques according to this disclosure can be initiated in response to a network access request by user equipment such as a mobile telephone, or any number of devices (computers, televisions, internet of things (IOT) devices, etc.) that may connect via a home or office internet connection, or any other device. For example, a user equipment may send a fourth generation (4G) type network access request to a radio access node, such as an e-node B (eNB) type radio access node. The network access request can optionally include, inter alia, an access point name (APN) of an access point requested by the user equipment.

The eNB can forward the network access request along to a PCN, e.g., to an MME component of the PCN. The eNB may include the eNB's tracking area code (TAC) with the network access request. The TAC identifies the eNB's geographic location and can be used by the MME to identify services and network components, such as gateways, which are geographically proximal to the eNB and the user equipment.

The MME can be configured to receive the network access request along with the TAC, and to select network components such as SGWs, PGWs, and optionally other PCN components, to enable cellular network service for the user equipment. Embodiments of this disclosure can configure the MME to use the TAC as well as additional gateway collocation information, such as charging characteristics (CC) information, to retrieve SGW identifiers of available SGWs which are available to enable the user equipment's network access.

CC information is one example of information that can be used, by an MME in accordance with embodiments of this disclosure, to determine whether collocated gateways are required or preferred for a user equipment's network service. However, it should be understood that this disclosure is not limited to the use of CC information, and embodiments can also be configured to use other collocation indicators.

In embodiments that use CC information for determinations regarding the use of collocated gateways, the MME can be configured to request CC information from an HSS. The request can be for CC information or more generally for subscription profile information of a subscription associated with the user equipment.

The HSS can return the CC information, optionally along with other subscription profile information. The CC information can optionally be in the form of an information element value, which can include, inter alia, an indicator of whether collocated gateways are required or preferred for a user equipment's network service.

The MME can be configured to determine, based on the CC information or other retrieved gateway collocation information, whether collocated gateways are preferred (or required) for a user equipment's network service, or conversely, whether collocated gateways are not preferred/required for the user equipment's network service. When collocated gateways are not preferred/required for a user equipment's network service, the MME can identify SGW and PGW gateways according to any approach, e.g., according to prior gateway identification approaches or otherwise. In contrast, when collocated gateways are preferred/required for a user equipment's network service, the MME can identify SGW and PGW gateways to enable the user equipment's network service according to the further techniques described herein.

In response to a determination, by the MME based on retrieved CC information, that collocated gateways are preferred/required for a user equipment's network service, the MME can optionally first determine an appropriate TAC for use in SGW selection. For example, the MME can be configured to access a TAC list comprising TACs that include collocated gateways. The MME can identify, from the TAC list, a TAC that is either identical to, or otherwise geographically near the eNB's TAC.

The MME can next generate a DNS query for available collocated SGWs. In an example, the MME can include the identified TAC as well as the CC information in the DNS query. In another embodiment, instead of including the CC information in the DNS query, the MME can include another indication that collocated gateways are required/preferred to enable the user equipment's service. The MME can be configured to send the generated DNS query to a DNS, e.g., as an SGW naming authority pointer (NAPTR) query.

The DNS can be configured to determine a DNS query type of the DNS query submitted by the MME. When an incoming DNS query does not include CC information or another indication that collocated gateways are required/preferred to enable a user equipment's service, then the DNS can identify SGWs according to any approach, e.g., according to prior gateway identification approaches or otherwise.

In contrast, when an incoming DNS query does include CC information or another indication that collocated gateways are required/preferred to enable a user equipment's service, then in response the DNS can identify SGWs from a limited set of collocated SGWs, wherein the limited set of SGWs includes SGWs that are collocated with corresponding PGWs. The DNS can identify SGWs from the limited set of SGWs based on the TAC received with the DNS query, e.g., by identifying SGWs that are in or near the geographic area of the received TAC. The one or more resulting SGW identifiers, resulting from the SGW identification operations by the DNS, can be returned by the DNS to the MME.

The MME can furthermore be configured to generate a supplemental DNS query for the purpose of determining available PGWs to enable network service provided to the user equipment. The supplemental DNS query can comprise the APN requested by the user equipment, and the supplemental DNS query can comprise a request for PGWs that are supported by the APN. The DNS can be configured to receive the supplemental DNS query, identify one or more PGWs supported by the APN, and return a list of one or more PGW identifiers of the PGWs supported by the APN.

After the MME receives the information returned from the DNS, i.e., the SGW identifiers returned in response to the DNS query, and the PGW identifiers returned in response to the supplemental DNS query, the MME can be configured to identify a collocated SGW and a corresponding collocated PGW based on the information returned from the DNS. In an example, the MME can be configured to perform a name matching procedure to match portions of the SGW names/identifiers with portions of the PGW names/identifiers. SGWs and PGWs having matching names (or matching portions of names) can be identified as collocated. The MME can be configured to select an SGW and PGW from among the one or more SGWs and PGWs that are identified as having matching names.

The techniques discussed herein may be implemented in a computer network using one or more of protocols including but are not limited to Ethernet, 3G, 4G, 4G/LTE, 5G, 6G, further radio access technologies, or any combination thereof. In some examples, network implementations may support standalone architectures, non-standalone architectures, dual connectivity, carrier aggregation, etc. Example implementations are provided below with reference to the following figures.

FIG. 1 illustrates an example network architecture 100 including a packet core network (PCN) 110 which comprises selectable gateway components, such as serving gateways (SGWs) 132, 113, 114, and packet gateways (PGWs) 134, 117, 118, which can be selected for use in connection with user equipment (UE) 102(1), 102(2) network access, according to an example of the present disclosure.

FIG. 1 illustrates a UE 102(1) connecting to an access network 104(1), and a UE 102(2) connecting to an access network 104(2). Both of the access networks 104(1) and 104(2) can connect to the PCN 110. The PCN 110 can comprise, e.g., an EPC type PCN including various components according to the EPC architecture, many of which are omitted from FIG. 1 for simplicity.

Illustrated components of the PCN 110 comprise an MME 111 which can be configured according to this disclosure to select collocated gateways 130, e.g., the SGW 132 and the PGW 134, to enable network access of a UE 102(1) under circumstances wherein collocated gateways 130 are preferred or required for a UE 102(1), as described herein. The MME 111 can also operate in a manner that allows selection of other gateways, e.g., SGWs 113, 114, or PGWs 117, 118, for other UEs such as UE 102(2), for which collocated gateway selection may not be preferred or required.

FIG. 1 further illustrates an IP multimedia subsystem network (IMS network 120), and various example components thereof, including, inter alia, an HSS 126 and a DNS 125. In embodiments of this disclosure, the MME 111 can be configured to communicate with the HSS 126 and the DNS 125 in connection with selection of collocated gateways 130.

The network architecture 100 as illustrated in FIG. 1 may be part of a telecommunication network of a wireless service provider such as, T-Mobile, AT&T, Verizon Wireless, etc. The telecommunication network may include one or more PCNs including the PCN 110, one or more IMSs including the IMS network 120, and one or more access networks including the access networks 104(1) and 104(2) and through which UEs 102(1) and 102(2) can connect to the one or more packet core networks and the IMSs. The PCN 106 may be a 4G evolved packet core (EPC) network or a 5G core network.

The access networks 104(1) and 104(2) may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology.

The access networks 104(1) and 104(2) may include various types of base stations, for example, 2G base stations and/or 3G NodeBs that are associated with GSM and CDMA access networks, eNBs that are associated with an LTE access network also known as an Evolved UMTS Terrestrial Radio Access Network (E-UTRAN), or gNBs or new radio (NR) base stations that are associated with a 5G access network.

The IMS network 120 may include multiple components that function together to deliver multimedia communications services such as voice, video and text messaging over an IP network, e.g., PCN 110. For example, the IMS network 120 may include, inter alia, a proxy call session control function (P-CSCF) 121, an interrogating call session control function (I-CSCF) 124, a serving call session control function (S-CSCF) 122, a telephony application server (TAS) 123, a home subscriber server (HSS) 126, a domain name server (DNS) 125, and a user data request function (UDR) 127.

In addition to selection of gateways by the MME 111, a UE 102(1), 102(2) may need to be registered on the IMS network 120 in order to use the IP multimedia service. As shown in FIG. 1, the UE 102(1) may connect to the PCN 110 through the access network 104(1) and may further register on the IMS network 120; while the UE 102(2) may connect to the PCN 110 through the access network 104(2) and may also further register on the IMS network 120.

During the registration process, the I-CSCF 124 may send a user authentication request (UAR) to the home subscriber server (HSS) 126 to authenticate a user equipment, e.g., UE 102(1) or UE 102(2). The HSS 126 may return a user authentication answer (UAA) that indicates whether the UAR is approved.

In some examples, the P-CSCF 121 may query a domain name server (DNS) 125 to discover a fully qualified domain name (FQDN) or the IP address of the I-CSCF 124 to forward the registration request from a UE. The I-CSCF 124 may also query the DNS 125 to obtain the FQDN or the IP address of the S-CSCF 122 to forward the registration request to complete the registration of the UE.

Once the UE 102(1) or UE 102(2) is registered (or reregistered) on the IMS network 120, the UE 102(1) or UE 102(2) can use the services provided through a plurality of application servers on the IMS network 120. The TAS 123 in the IMS network 120, for example, may provide basic call processing services and supplementary multimedia services between the users such as call setup, call waiting, call forwarding, caller ID service, origination-denial, termination-denial, lettering and coloring, etc.

It should be understood that the network scenario shown in FIG. 1 is for the purpose of illustration. In various real-world scenarios, telecommunication networks or one or more subsystems of a telecommunication network can be logically divided into a number of regions. Each of the regions may logically include a packet core network and an IMS network.

Furthermore, in some examples, each of the DNS 125, the HSS 126, and the TAS 123 may be configured as a centralized component of the telecommunication network accessible to all logically divided IMS networks. Further, although the IMS network 120 as shown in FIG. 1 includes a single P-CSCF 121, a single S-CSCF 122, and a single I-CSCF 124, the IMS network 120 can optionally include two or more P-CSCFs, S-CSCFs, and I-CSCFs.

The techniques discussed herein may be implemented in the telecommunication network using one or more of protocols including but are not limited to Ethernet, 3G, 4G, 4G LTE, 5G, or any combination thereof. The techniques may also optionally be implemented in the telecommunication network using 6G and/or future radio access technologies.

Figure 2:
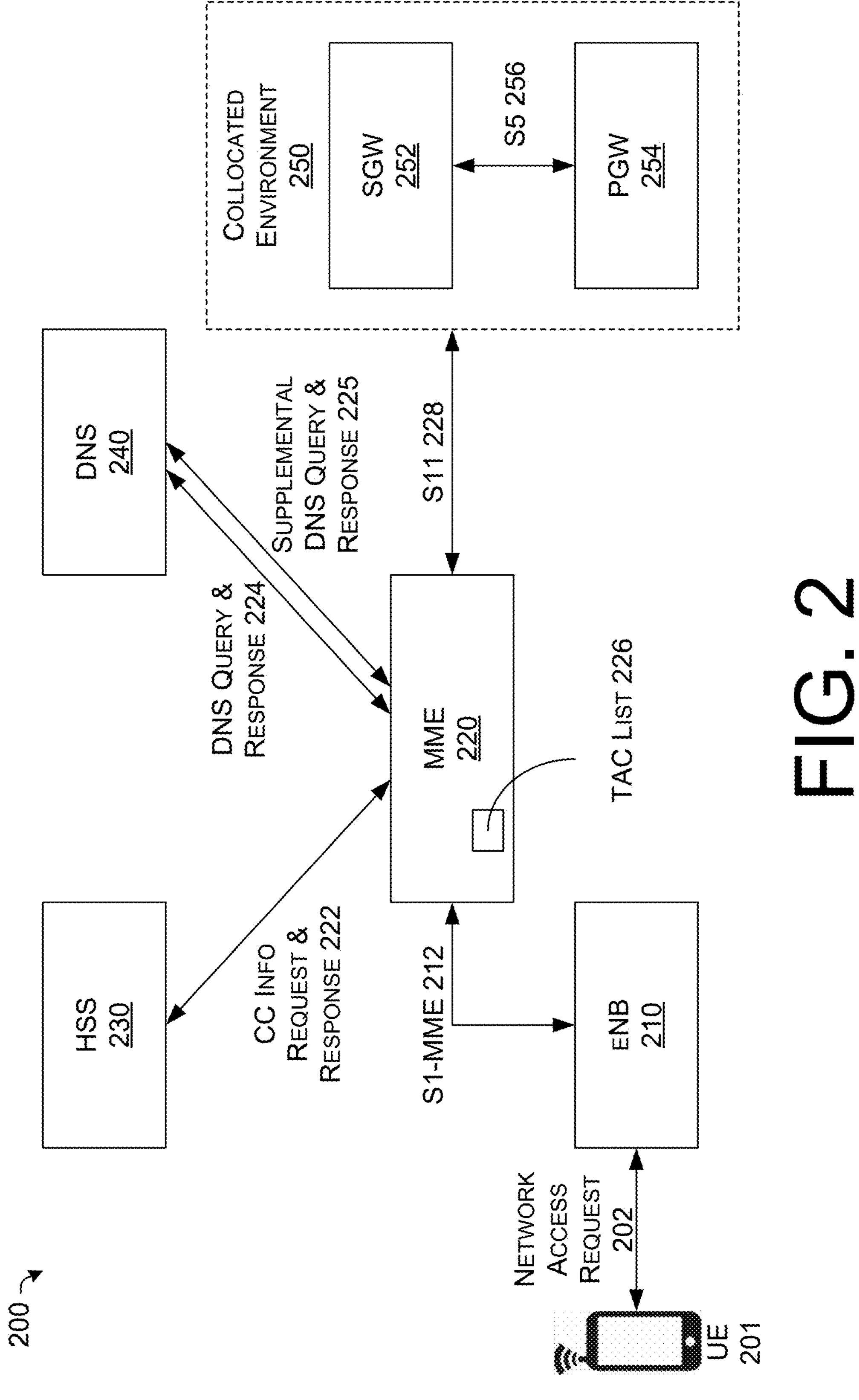
FIG. 2 illustrates example network components and example communications therebetween, which can be applied in connection with selection of collocated gateways, according to an example of the present disclosure.

FIG. 2 illustrates example network components and example communications therebetween, which can be applied in connection with selection of collocated gateways, according to an example of the present disclosure. FIG. 2 includes a group 200 of network components which can implement corresponding components introduced in FIG. 1 in some embodiments. The group 200 includes a UE 201, an eNB 210, an MME 220, an HSS 230, a DNS 240, an SGW 252 and a PGW 254, wherein the SGW 252 and the PGW 254 are collocated and as such are located in a collocated environment 250.

The components illustrated in FIG. 2 can be coupled via standard interface types. For example, the eNB 210 can be coupled to the MME 220 via an interface of type S1-MME 212. The MME 220 can be coupled to the collocated environment 250 via an interface of type S11 228. The SGW 252 and the PGW 254 can be coupled via an interface of type S15 256.

In operations according to FIG. 2, the UE 201 can send a network access request 202 to a radio access node such as the eNB 210. The network access request 202 can optionally include, inter alia, an APN of an access point requested by the UE 201. The eNB 210 can forward the network access request 202 via the S1-MME 212 to the MME 220. The eNB 210 may include an eNB 210 TAC with the network access request 202. The TAC can identify the eNB 210 geographic location and the TAC can be used by the MME 220 to identify services and network components, such as gateways, that are geographically proximal to the eNB 210 and/or the UE 201.

The MME 220 can be configured to receive the network access request 202 along with the eNB 210 TAC, and to select network components such as SGWs, PGWs, and optionally other PCN components, to enable cellular network service for the UE 201. The MME 220 can be configured to look up or retrieve additional gateway collocation information, such as CC information, to determine whether collocated gateways are required or preferred for the UE's 201 network service.

In embodiments that use CC information for determinations regarding the use of collocated gateways, the MME 220 can be configured to request CC information from the HSS 230. In some embodiments, the MME 220 can optionally request subscription profile information of a subscription associated with the UE 201, and the subscription profile information can include CC information or any other indication of whether collocated gateways are required or preferred for the UE's 201 network service. CC information request and response 222 can comprise a request for CC information sent from MME 220 to the HSS 230 and a corresponding response comprising CC information, returned from the HSS 230 to the MME 220. The returned CC information can optionally be in the form of an information element value, which can optionally comprise a type-length-value format, including a type, a length indicator, and a value indicative of whether collocated gateways are required or preferred for the UE's 201 network service.

The MME 220 can be configured to determine, based on the CC information or other retrieved gateway collocation information, whether collocated gateways are preferred (or required) for the UE's 201 network service, or conversely, whether collocated gateways are not preferred/required for the UE's 201 network service. For example, some CC values included in the CC information may indicate that collocated gateways are preferred/required, while other CC values included in the CC information may indicate that collocated gateways are not preferred/required. The MME 220 can be configured to determine a CC value and make a corresponding determination based on the CC value.

When collocated gateways are not preferred/required for UE's 201 network service, the MME 220 can identify SGW and PGW gateways according to any approach, e.g., according to prior gateway identification approaches or otherwise. In contrast, when collocated gateways are preferred/required for UE's 201 network service, the MME 220 can identify SGW and PGW gateways to enable the UE's 201 network service using collocated gateways, such as the SGW 252 and the PGW 254, which are located in the collocated environment 250.

In response to a determination, by the MME 220 based on retrieved CC information, that collocated gateways are preferred/required for UE's 201 network service, the MME 220 can optionally first determine an appropriate TAC for use in SGW selection. For example, the MME 220 can be configured to access the TAC list 226, wherein the TAC list 226 identifies TACs that include collocated gateways. The MME 220 can identify, from the TAC list 226, a TAC that is either identical to, or otherwise geographically near the TAC identified by the eNB 210 along with the network access request 202 forwarded to the MME 220.

The MME 220 can next generate a DNS query for available collocated SGWs. The DNS query can be sent to the DNS 240 as part of DNS query and response 224. In an example, the MME 220 can include the identified TAC from the TAC list 226, as well as the CC information retrieved from the HSS 230, in the DNS query. In another embodiment, instead of including the CC information in the DNS query, the MME 220 can include another indication that collocated gateways are required/preferred to enable the UE's 201 service. The MME 220 can be configured to send the generated DNS query to the DNS 240 as an SGW NAPTR query.

The DNS 240 can be configured to determine a DNS query type of the DNS query submitted by the MME 220. When an incoming DNS query does not include CC information or another indication that collocated gateways are required/preferred to enable a UE's 201 service, then the DNS 240 can identify SGWs according to any approach, e.g., according to prior gateway identification approaches or otherwise.

In contrast, when an incoming DNS query does include CC information or another indication that collocated gateways are required/preferred to enable a UE's 201 service, then in response the DNS 240 can identify SGWs from a limited set of collocated SGWs, wherein the limited set of SGWs includes SGWs that are collocated with corresponding PGWs. The DNS 240 can identify SGWs from the limited set of SGWs based on the TAC received with the DNS query, e.g., by identifying SGWs that are in or near the geographic area of the received TAC. The one or more resulting SGW identifiers, resulting from the SGW identification operations by the DNS 240, can be returned by the DNS 240 to the MME 220 as part of the DNS query and response 224. In the example provided by FIG. 2, the SGW identifiers returned from the DNS 240 to the MME 220 can include, inter alia, the SGW 252 which is ultimately selected by the MME 220 to enable the UE's 201 network service.

The MME 220 can furthermore be configured to generate a supplemental DNS query for the purpose of determining available PGWs to enable network service provided to the UE 201. The supplemental DNS query can be sent to the DNS 240 as part of supplemental DNS query and response 225. The supplemental DNS query can comprise the APN requested by the UE 201 via the network access request 202, and the supplemental DNS query can comprise a request for PGWs that are supported by the APN. The DNS 240 can be configured to receive the supplemental DNS query, identify one or more PGWs supported by the APN, and return to the MME 220 a list of one or more PGW identifiers of the PGWs supported by the APN. The returned PGW identifiers can be returned to the MME 220 as part of supplemental DNS query and response 225. In the example provided by FIG. 2, the PGW identifiers returned from the DNS 240 to the MME 220 can include, inter alia, the PGW 254 which is ultimately selected by the MME 220 to enable the UE's 201 network service.

After the MME 220 receives the information returned from the DNS 240, i.e., the SGW identifiers returned in response to the DNS query, and the PGW identifiers returned in response to the supplemental DNS query, the MME 220 can be configured to identify a collocated SGW 252 and a corresponding collocated PGW 254 based on the information returned from the DNS 240. In an example, the MME 220 can be configured to perform a name matching procedure to match portions, such as hostnames, of the returned SGW names/identifiers with portions, such as hostnames, of the returned PGW names/identifiers. SGWs and PGWs having matching names (or matching portions of names) can be identified as collocated with collocated environments such as the collocated environment 250. The MME 220 can be configured to select an SGW 252 and PGW 254 from among the one or more SGWs and PGWs that are identified as having matching names. The MME 220 can then proceed to use the selected collocated SGW 252 and PGW 254 to enable the UE 201's network service.

Figure 3:
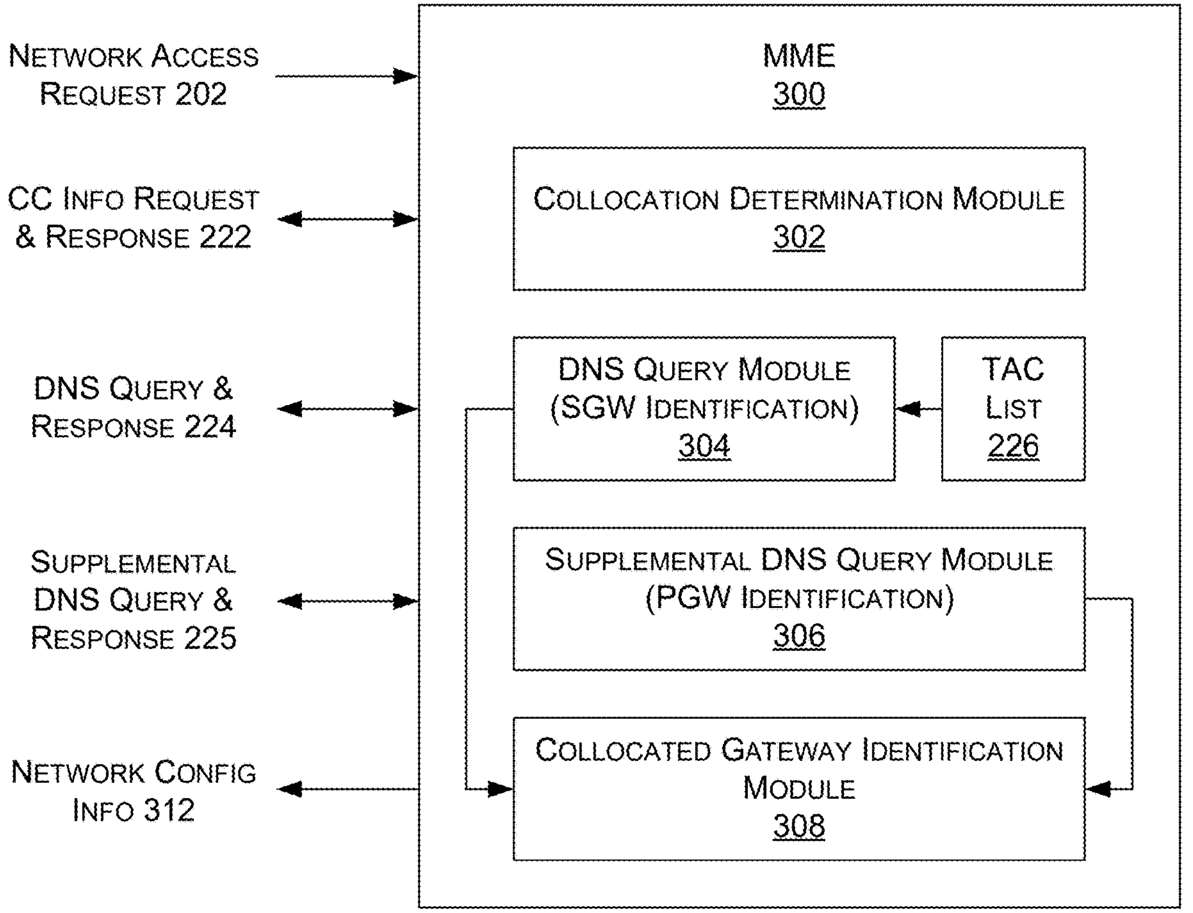
FIG. 3 illustrates an example mobility management entity (MME) and components thereof, according to another example of the present disclosure.

FIG. 3 illustrates an example mobility management entity (MME) 300 and components thereof, according to another example of the present disclosure. The MME 300 can implement the MME 220 or the MME 111 in some embodiments. The MME 300 comprises a collocation determination module 302, a DNS query module 304, the TAC list 226 introduced in FIG. 2, a supplemental DNS query module 306, and a collocated gateway identification module 308.

Example operations of the MME 300 can comprise receiving a network access request 202. The network access request 202 can be received from an eNB 210 and can be accompanied by a TAC associated with the eNB 210. The network access request 202 can pertain to network access for a UE 201.

In response to the network access request 202, the MME 300 can be configured to select gateways to enable network access by the UE 201. In general, the MME 300 can be configured to use collocation determination module 302 to determine whether collocated gateways are preferred or required for the UE's 201 network service. When collocated gateways are preferred or required, the MME 300 can use DNS query module 304 to determine identifiers of collocated SGWs; the MME 300 can use supplemental DNS query module 306 to determine identifiers of PGWs, and the MME 300 can use collocated gateway identification module 308 to determine, based on the identifiers of collocated SGWs and the identifiers of PGWs, a collocated SGW and a corresponding collocated PGW. The MME 300 can be configured to select the collocated SGW and a corresponding collocated PGW for use in connection with the UE's 201 network service.

In further detail with respect to FIG. 3, the collocation determination module 302 can optionally be configured to participate in CC info request and response 222 in order to determine whether collocated gateways are preferred or required for the UE's 201 network service. The CC info request and response 222 can comprise communications with an HSS 230 as illustrated in FIG. 2. The collocation determination module 302 can be configured to determine, based on CC information returned from the HSS 230 and associated with the UE 201, whether collocated gateways are preferred or required for the UE's 201 network service. For example, a first CC value or first range of CC values may correspond to a collocation requirement associated with the UE 201, while a second CC value or second range of CC values may correspond to no collocation requirement associated with the UE 201. When there is no collocation requirement, the MME 300 can be configured to use any approach for gateway selection. When there is a collocation requirement, the MME 300 can be configured to use the techniques described herein for collocated gateway selection.

When the collocation determination module 302 determines that there is a collocation requirement, the MME 300 can be configured to use the DNS query module 304 to retrieve identifiers of available collocated SGWs. The DNS query module 304 can be configured to use the TAC received with the network access request 202 to identify a TAC that is equipped with collocated gateways. If the TAC received with the network access request 202 is equipped with collocated gateways, then the TAC received with the network access request 202 can be used in a DNS query and response 224. If the TAC received with the network access request 202 is not equipped with collocated gateways, then the DNS query module 304 can be configured to identify a nearby TAC for use in the DNS query and response 224.

The DNS query and response 224 can include, in a DNS query, the identified TAC from the TAC list 226 optionally in addition to the CC information retrieved from the HSS, or any other indicator that collocated gateway identifiers are requested. The DNS 240 can return, in response to the DNS query, identifiers of collocated SGWs that are in or near the TAC identified in the DNS query. The DNS query module 304 can be configured to provide the returned identifiers of collocated SGWs to the collocated gateway identification module 308.

The MME 300 can also be configured to use the supplemental DNS query module 306 to retrieve identifiers of available collocated PGWs. In some embodiments, an APN from the network access request 202 can be included in a supplemental DNS query portion of the supplemental DNS query and response 225. The DNS 240 can be configured to return, in response to the supplemental DNS query, identifiers of PGWs that are associated with the APN. The supplemental DNS query module 306 can be configured to provide the returned identifiers of collocated PGWs to the collocated gateway identification module 308.

The collocated gateway identification module 308 can be configured to identify, based on the SGW identifiers provided by the DNS query module 304 and the PGW identifiers provided by the supplemental DNS query module 306, a collocated SGW and a corresponding collocated PGW to enable network service for the UE 201. In some embodiments, the collocated gateway identification module 308 can be configured to perform a name matching process that identifies collocated gateway pairs based on portions of the SGW identifiers and portions of the PGW identifiers, such as host names or other information included in the identifiers. Depending on the name matching approach, collocated gateway pairs can comprise gateways that are collocated in a same node, same facility such as a data center, same geographical area, or same market. The MME 300 can be configured select and use a collocated gateway pair identified by the collocated gateway identification module 308, to enable network access by the UE 201.

Figure 4:
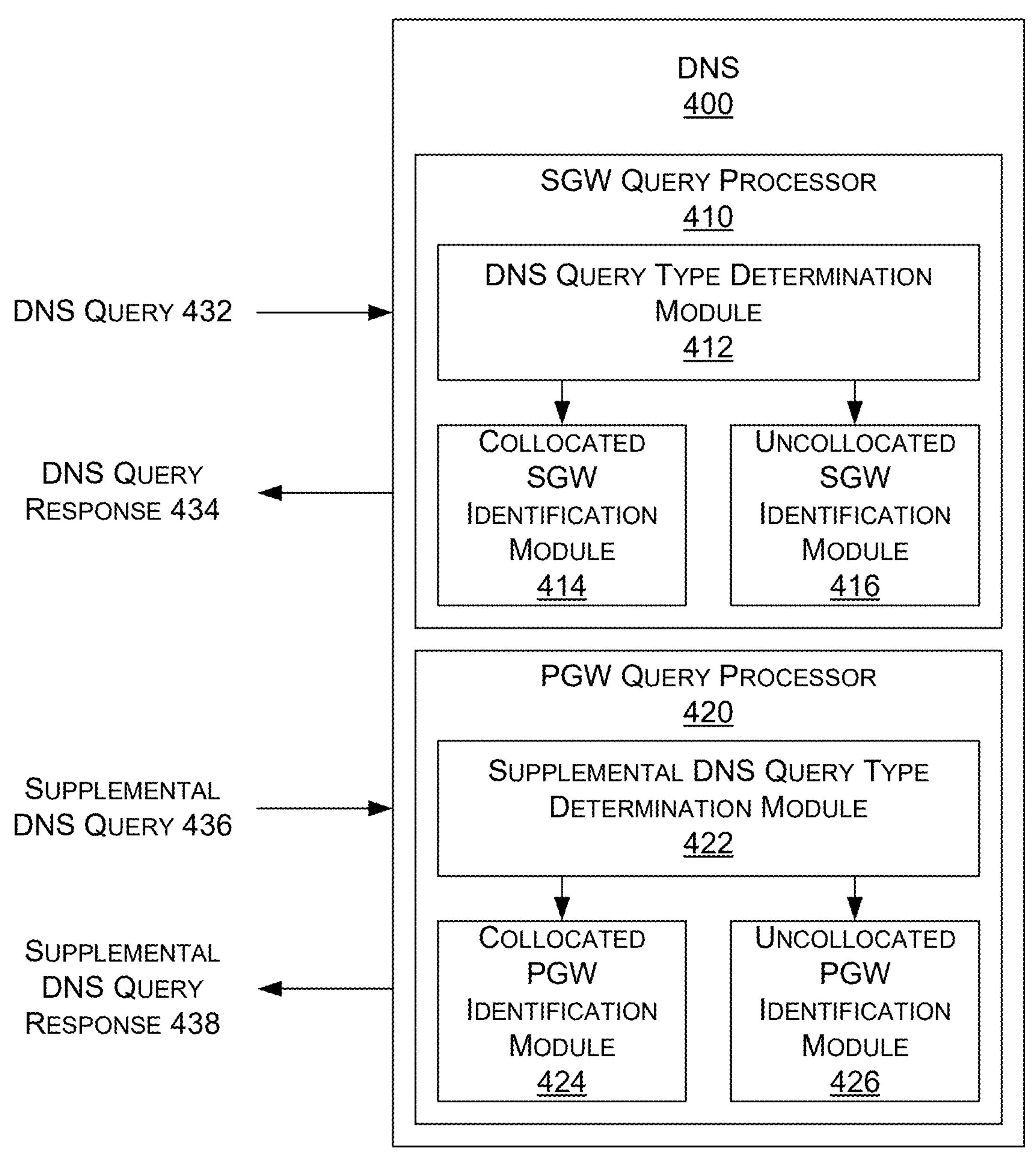
FIG. 4 illustrates an example domain name server (DNS) and components thereof, according to an example of the present disclosure.

FIG. 4 illustrates an example domain name server (DNS) 400 and components thereof, according to an example of the present disclosure. The DNS 400 can implement the DNS 240 or the DNS 125 in some embodiments. The DNS 400 comprises an SGW query processor 410 and a PGW query processor 420. The SGW query processor 410 comprises a DNS query type determination module 412, a collocated SGW identification module 414, and an uncollocated SGW identification module 416. The PGW query processor 420 comprises a supplemental DNS query type determination module 422, a collocated PGW identification module 424, and an uncollocated PGW identification module 426.

In general, the SGW query processor 410 can be configured to process DNS queries for collocated SGW identifiers as well as DNS queries for uncollocated SGW identifiers, and the PGW query processor 420 can be configured to process supplemental DNS queries for collocated PGW identifiers as well as supplemental DNS queries for uncollocated PGW identifiers. The DNS 400 can be configured to return gateway identifiers of collocated gateways in response to DNS queries for collocated gateway identifiers, and DNS 400 can be configured to return gateway identifiers of any gateways (i.e., collocated or uncollocated) in response to DNS queries for uncollocated gateway identifiers.

In further detail with regard to FIG. 4, the DNS query 432 can comprise, e.g., a DNS query portion of DNS query and response 224. Upon receipt of the DNS query 432, the DNS query type determination module 412 can determine whether the DNS query 432 is a request for collocated SGW identifiers, or conversely whether the DNS query 432 is a request for any SGW identifiers, whether collocated or uncollocated.

In some embodiments, the DNS query type determination module 412 can be configured to determine whether the DNS query 432 includes CC information or another indicator that the DNS query 432 is for collocated SGW identifiers, and if the DNS query 432 includes such a collocation indicator, the DNS query type determination module 412 can flag the DNS query 432 as a query for collocated SGW identifiers, to be processed by collocated SGW identification module 414. If the DNS query 432 does not include a collocation indicator, the DNS query type determination module 412 can flag the DNS query 432 as a query for any SGW identifiers (whether collocated or not), to be processed by the uncollocated SGW identification module 416.

The collocated SGW identification module 414 can be configured to use an included TAC which is included in the DNS query 432 to locate one or more SGW identifiers of collocated SGWs which are either in the included TAC, or in a nearby TAC. A nearby TAC can be defined according to any desired definition, e.g., a nearby TAC can comprise a TAC that is within a defined distance radius from the included TAC, or a nearby TAC can comprise a nearest TAC which is equipped with a collocated SGW. In order to locate one or more SGW identifiers of collocated SGWs, the collocated SGW identification module 414 can be configured to search a data store comprising collocated SGWs, wherein collocated SGWs are flagged as collocated, or wherein the collocated SGWs are otherwise separated or demarcated in order to distinguish collocated SGWs from uncollocated SGWs.

In an example implementation, the uncollocated SGW identification module 416 can be configured to use an included TAC which is included in the DNS query 432 to locate one or more SGW identifiers of SGWs (whether collocated or uncollocated) which are either in the included TAC, or in a nearby TAC. In order to locate one or more SGW identifiers, the uncollocated SGW identification module 416 can be configured to search a data store comprising collocated and uncollocated SGWs, wherein collocated SGWs may optionally be flagged as collocated, however, the uncollocated SGW identification module 416 need not distinguish between collocated and uncollocated SGWs.

The SGW query processor 410 can be configured to generate and return the DNS query response 434 to the MME that submitted the DNS query 432. When the DNS query 432 was a query for collocated SGWs, the DNS query response 434 can comprise SGW identifiers of collocated SGWs identified by the collocated SGW identification module 414. When the DNS query 432 was a query for uncollocated SGWs, the DNS query response 434 can comprise SGW identifiers of collocated and/or uncollocated SGWs identified by the uncollocated SGW identification module 416.

The supplemental DNS query 436 can comprise, e.g., a supplemental DNS query portion of supplemental DNS query and response 225. Upon receipt of the supplemental DNS query 436, the supplemental DNS query type determination module 422 can optionally determine whether the supplemental DNS query 436 is a request for collocated PGW identifiers, or conversely whether the supplemental DNS query 436 is a request for any PGW identifiers, whether collocated or uncollocated. Some embodiments can omit the supplemental DNS query type determination module 422 as well as the collocated PGW identification module, relying instead on the collocated gateway identification module 308 to determine a collocated PGW from among PGWs identified by the PGW query processor 420.

In embodiments comprising a supplemental DNS query type determination module 422, the supplemental DNS query type determination module 422 can be configured to determine whether the supplemental DNS query 436 includes CC information or another indicator that the supplemental DNS query 436 is for collocated PGW identifiers, and if the supplemental DNS query 436 includes such a collocation indicator, the supplemental DNS query type determination module 422 can flag the supplemental DNS query 436 as a query for collocated PGW identifiers, to be processed by collocated PGW identification module 424. If the supplemental DNS query 436 does not include a collocation indicator, the supplemental DNS query type determination module 422 can flag the supplemental DNS query 436 as a query for any PGW identifiers (whether collocated or not), to be processed by the uncollocated PGW identification module 426.

The collocated PGW identification module 424 can be configured to use an included APN which is included in the supplemental DNS query 436. In order to locate one or more PGW identifiers of collocated PGWs, the collocated PGW identification module 424 can be configured to search a data store comprising collocated PGWs, wherein collocated PGWs are flagged as collocated, or wherein the collocated PGWs are otherwise separated or demarcated in order to distinguish collocated PGWs from uncollocated PGWs.

In an example implementation, the uncollocated PGW identification module 426 can be configured to use an included APN which is included in the supplemental DNS query 436 to locate one or more PGW identifiers of PGWs (whether collocated or uncollocated) which are associated with the APN. In order to locate one or more PGW identifiers, the uncollocated PGW identification module 426 can be configured to search a data store comprising collocated and uncollocated PGWs, wherein collocated PGWs may optionally be flagged as collocated, however, the uncollocated PGW identification module 426 need not distinguish between collocated and uncollocated PGWs.

The PGW query processor 420 can be configured to generate and return the supplemental DNS query response 438 to the MME that submitted the supplemental DNS query 436. When the supplemental DNS query 436 was a query for collocated PGWs, the supplemental DNS query response 438 can comprise PGW identifiers of collocated PGWs identified by the collocated PGW identification module 424. When the supplemental DNS query 436 was a query for uncollocated PGWs, the supplemental DNS query response 438 can comprise PGW identifiers of collocated and/or uncollocated PGWs identified by the uncollocated PGW identification module 426.

Figure 5:
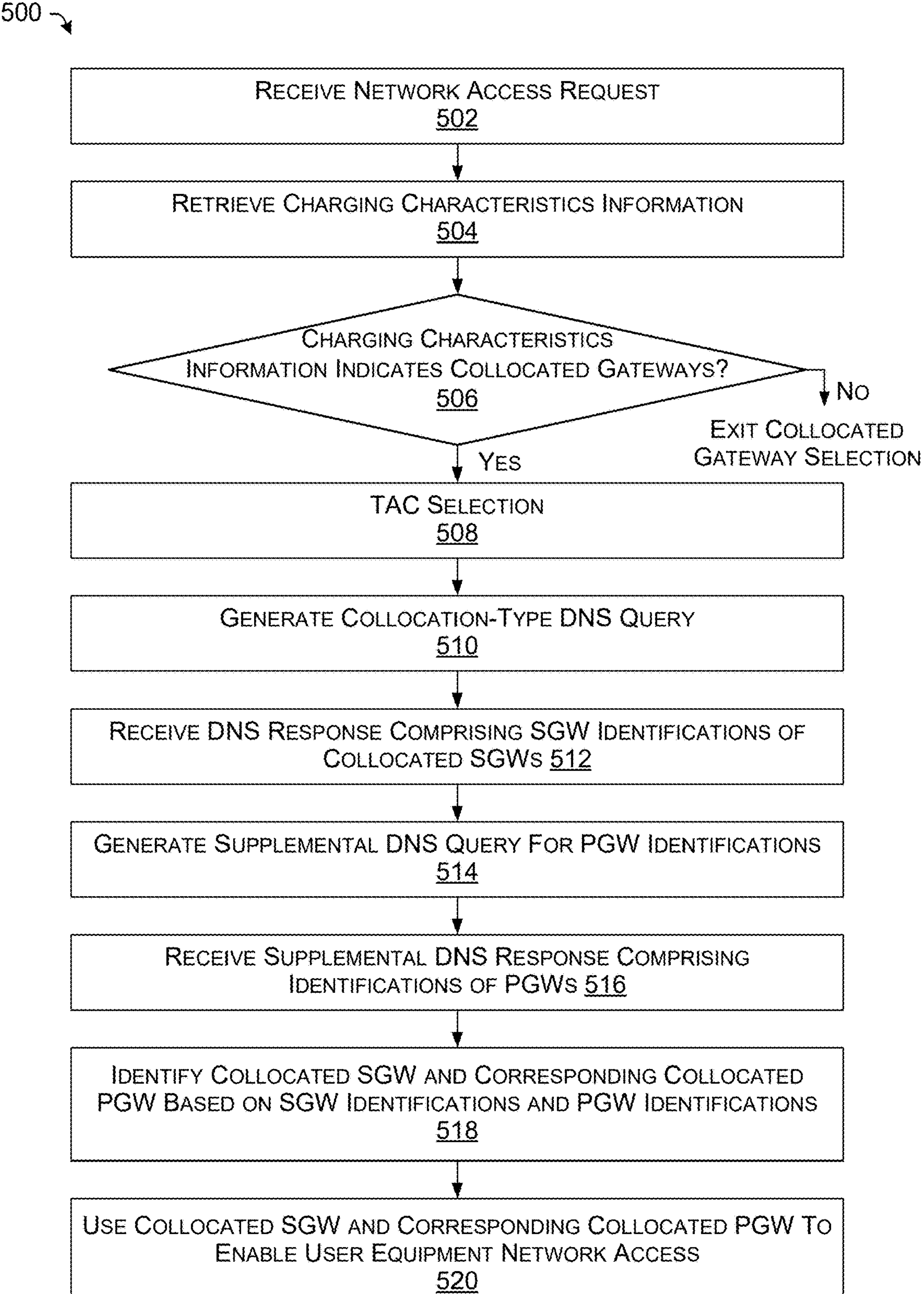
FIG. 5 is a flowchart illustrating example operations performed by an MME, according to an example of the present disclosure.

FIG. 5 is a flowchart illustrating example operations performed by an MME, according to an example computer-implemented method of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 5 can be performed at least in part by network equipment of a cellular communication network, such as network equipment comprising an MME 300 illustrated in FIG. 3. At operation 502, the MME 300 can receive a network access request 202 to enable UE 201 access to the cellular communication network. The remaining operations illustrated in FIG. 5 can be performed in response to the network access request 202 and can select gateways to enable the UE 201 network access.

At operation 504, the MME 300 can retrieve charging characteristics (CC) information associated with the UE 201. The CC information is one example of an indicator which indicates whether collocated gateways (SGWs and PGWs) are applicable, e.g., by being required or preferred, to enable the UE 201 access to the cellular communication network. In some embodiments, operation 504 can comprise retrieving the CC information by requesting the CC information from an HSS. Some examples can request CC information by requesting subscriber profile information which includes a CC value.

At operation 506, the MME 300 can determine whether the CC information indicates collocated gateways are applicable for the UE 201. If not, then the MME 300 can exit collocated gateway selection according to FIG. 5 and can instead perform any desired gateway selection process. In contrast, in response to the CC information indicating that collocated SGWs and PGWs are applicable to enable the UE 201 access to the cellular communication network, the MME 300 can perform collocated gateway selection according to the remaining operations illustrated in FIG. 5.

At operation 508, the MME 300 can select a TAC for use in a collocation-type DNS query. The MME 300 can select the TAC based at least in part on a received TAC which is received along with the network access request 202. The MME 300 can also select the TAC based at least in part on the CC information, i.e., TAC selection is performed when the CC information indicates collocated gateway selection is applicable. The selected TAC can comprise, e.g., a TAC from a TAC list 226 of TACs comprising collocated gateways.

At operation 510, the MME 300 can generate a collocation-type DNS query. The collocation-type DNS query can generally comprise a request for SGW identification information associated with one or more collocated SGWs that are available to enable the UE 201 access to the cellular communication network, wherein the one or more collocated SGWs are each collocated with a PGW. In some embodiments, the collocation-type DNS query can comprise the CC information retrieved at operation 504, and the TAC selected at operation 508.

At operation 512, the MME 300 can receive a DNS response to the DNS query submitted at operation 510. The DNS response can comprise SGW identifications of collocated SGWs. The collocated SGWs may also be located in or near the TAC included in the collocation-type DNS query. The SGW identifications can be matched with corresponding collocated PGWs at operation 518, after the MME 300 also retrieves PGW identifications from the DNS.

At operation 514, the MME 300 can generate a supplemental DNS query. The supplemental DNS query can comprise a request for PGW identification information associated with a collocated PGW that is available to enable the UE 201 access to the cellular communication network. In some examples, the supplemental DNS query can identify an APN requested by the UE 201. The supplemental DNS query can optionally also identify an indicator such as CC information which indicates collocated PGNs are requested. At operation 516, the MME 300 can receive a supplemental DNS response to the supplemental DNS query, the supplemental DNS response comprising the requested PGW identification information.

At operation 518, the MME 300 can identify, based at least in part on the SGW identification information received at operation 512, a collocated SGW and a corresponding collocated PGW to enable the UE 201 access to the cellular communication network. Identifying the collocated SGW and the corresponding collocated PGW can be further based at least in part on the PGW identification information received at operation 516. In some examples, identifying the collocated SGW and the corresponding collocated PGW can comprise performing a name matching process to match at least portions of the SGW identification information with at least portions of the PGW identification information. If multiple collocated SGW PGW pairs are identified, the MME 300 can select the collocated SGW and corresponding collocated PGW from among the multiple matching pairs.

The MME 300 can perform operation 518 in a manner that adheres to a determined collocation definition or requirement. For example, the collocated SGW and the corresponding collocated PGW can be collocated in a same market of multiple different markets served by the cellular communications network. In another example, the collocated SGW and the corresponding collocated PGW can be collocated on a same node of multiple different nodes operated by the cellular communications network.

At operation 520, the MME 300 can use the collocated SGW and the corresponding collocated PGW to enable the UE 201 access to the cellular communication network. The MME 300 can configure and send network config info 312 in order to use the collocated SGW and the corresponding collocated PGW to enable the UE 201 access to the cellular communication network.

Figure 6:
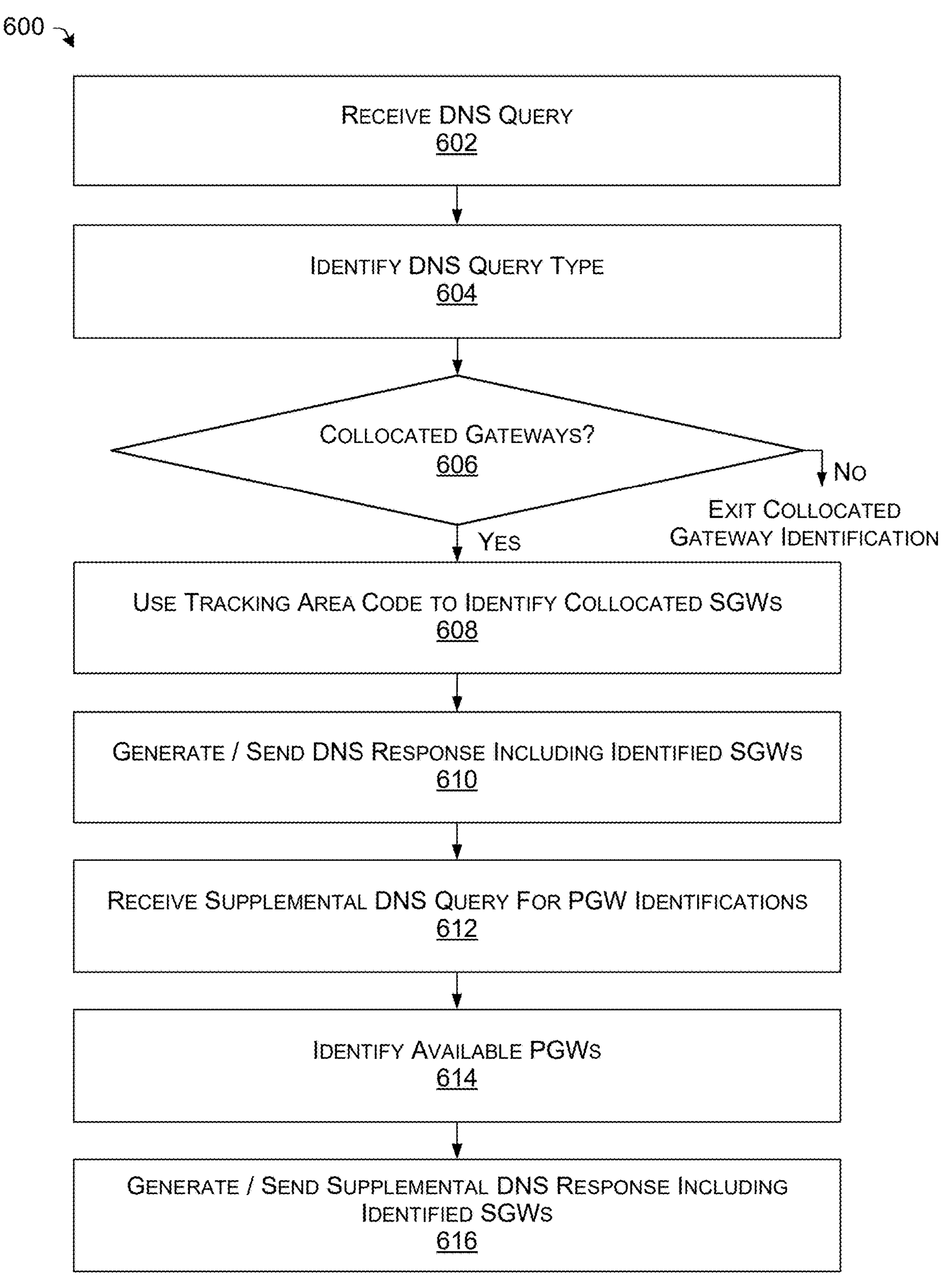
FIG. 6 is a flowchart illustrating example operations performed by a DNS, according to an example of the present disclosure.

FIG. 6 is a flowchart illustrating example operations performed by a DNS, according to an example computer-implemented method of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 6 can be performed at least in part by network equipment of a cellular communication network, such as network equipment comprising a DNS 400 illustrated in FIG. 4. Operation 602 comprises receiving a DNS query 432 from a MME. In an example, the DNS query can comprise a request for one or more SGW IP addresses (or other SGW identifiers), a TAC, and a collocation indicator such as CC information. The requested SGW IP addresses can be IP addresses associated with one or more collocated SGWs. The collocated SGWs are collocated with corresponding collocated PGWs, and a collocated SGW of the collocated SGWs can be selected for use by the MME to enable network access by a UE 201. The TAC identifies a tracking area associated with the UE 201, i.e., by being at least based on a TAC of an eNB 210 that serves the UE 201. The CC information is also associated with the UE 201, for example by being associated with a subscription profile of a subscription associated with the UE 201.

Operation 604 comprises identifying a DNS query type. For example, the DNS query 432 can be identified as a query for collocated gateway identifiers, or for any gateway identifiers (whether collocated or not). The DNS query 432 can comprise an indicator, such as CC information, which can optionally be used to identify the DNS query 432 as a query for collocated gateway identifiers. At operation 606, in response to determining the DNS query 432 is a query for collocated gateway identifiers, the subsequent illustrated operations 608-616 can be performed. Alternatively, in response to determining the DNS query 432 is not a query for collocated gateway identifiers, the DNS can exit the collocated gateway identification process and can use any desired process to identify gateways.

At operation 608, the DNS 400 can identify, in response to the DNS query 432, one or more IP addresses or other SGW identifiers of collocated SGWs. The identifying IP addresses at operation 608 can be is based on the TAC received as part of the DNS query 432. For example, the identified SGWs can be SGWs in or near the TAC. At operation 610, the DNS 400 can return the IP addresses of identified collocated SGWs to the MME. For example, the DNS 400 can generate and send the DNS query response 434 to the MME.

At operation 612, the DNS 400 can receive a supplemental DNS query 436, wherein the supplemental DNS query comprises a request for PGW identification information of at least one PGW that is available to enable the UE 201 access to the cellular communication network. The supplemental DNS query 436 can identify an APN requested by the UE 201.

At operation 614, the DNS 400 can identify, in response to the supplemental DNS query 436, the at least one PGW. The at least one PGW can comprise a collocated PGW which is associated with the APN. At operation 616, the DNS 400 can return an identification of the at least one PGW to the MME. For example, the DNS 400 can generate and send the supplemental DNS query response 438 to the MME.

Figure 7:
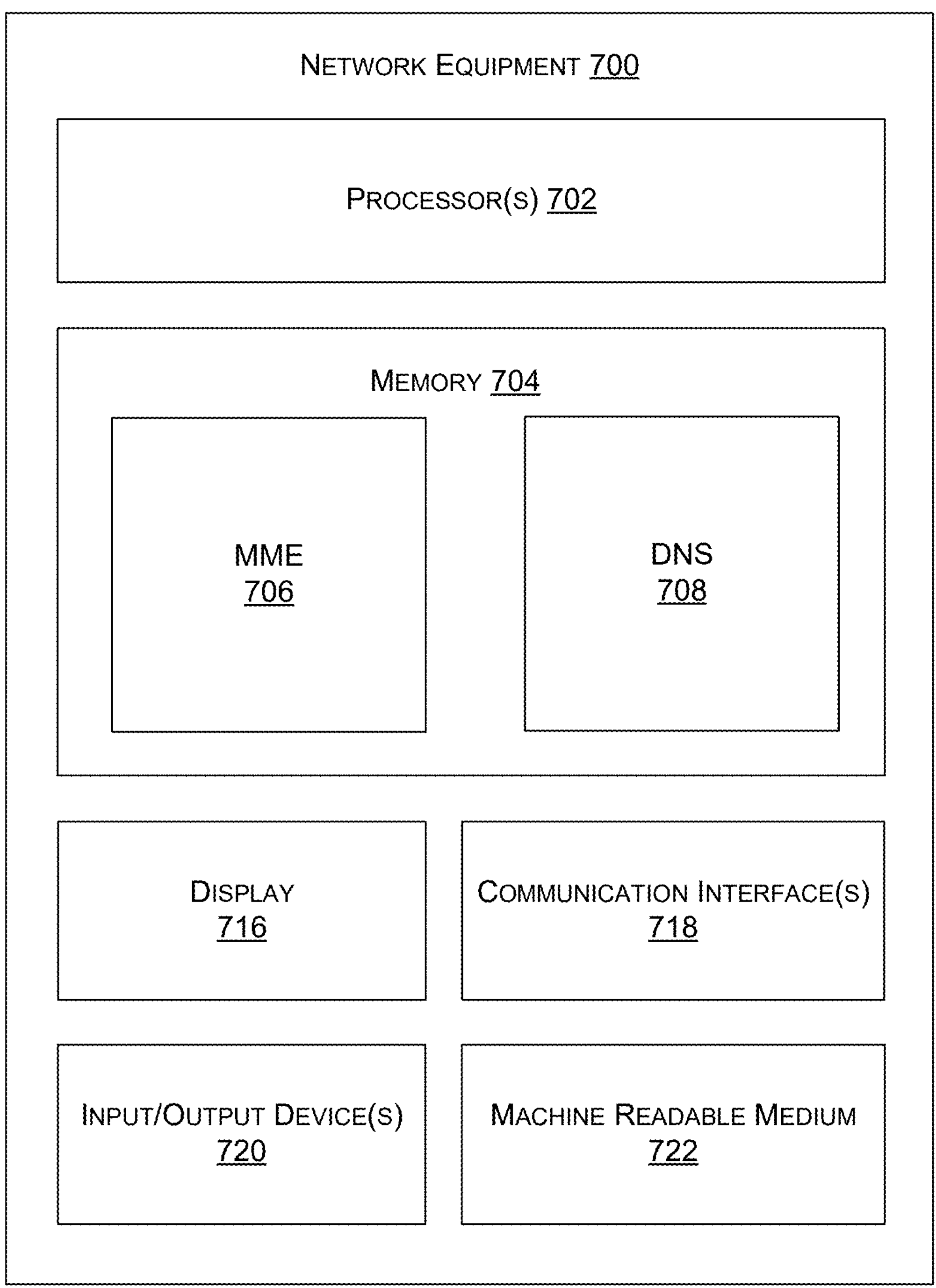
FIG. 7 illustrates example network equipment that can implement the techniques disclosed herein, according to an example of the present disclosure.

FIG. 7 illustrates example network equipment that can implement the techniques disclosed herein, according to an example of the present disclosure. In some embodiments, the example network equipment 700 may host an MME 706, such as the MME 300 illustrated in FIG. 3. In other embodiments, the example network equipment 700 may host a DNS 400, such as the DNS 400 illustrated in FIG. 4.

As illustrated in FIG. 7, a network equipment 700 may comprise processor(s) 702, a memory 704, a display 716, communication interface(s) 718, input/output device(s) 720, and/or a machine readable medium 722.

In various examples, the processor(s) 702 can be a central processing unit (CPU), a graphics processing unit (GPU), or both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in memory 704, which can be associated with common types of volatile (RAM) and/or nonvolatile (ROM) memory.

In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data, which can cause the processor 702 to perform actions. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the network equipment 700. Any such non-transitory computer-readable media may be part of the network equipment 700.

In embodiments wherein the network equipment 700 implements an MME, such as the MME 300 illustrated in FIG. 3, the memory 704 can comprise MME 706 which can include the components illustrated herein and any other MME components to implement other features and functions. In embodiments wherein the network equipment 700 implements DNS, such as the DNS 400 illustrated in FIG. 4, the memory 704 can comprise DNS 708 which can include the components illustrated herein and any other DNS components to implement other features and functions.

The communication interface(s) 718 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 718 can be compatible with multiple radio access technologies, such as 5G radio access technologies and 4G/LTE radio access technologies. Accordingly, the communication interfaces 718 can allow the network equipment 700 to connect to the 5G system described herein.

Display 716 can be a liquid crystal display or any other type of display commonly used in the network equipment 700. For example, display 716 may be a touch-sensitive display screen and can then also act as an input device or keypad, such as for providing a soft-key keyboard, navigation buttons, or any other type of input.

Input/output device(s) 720 can include any sort of output devices known in the art, such as a display, speakers, a vibrating mechanism, and/or a tactile feedback mechanism. Input/output device(s) 720 can also include ports for one or more peripheral devices, such as headphones, peripheral speakers, and/or a peripheral display. Input/output device(s) 720 can include any sort of input devices known in the art. For example, input/output device(s) 720 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 722 can store one or more sets of instructions, such as software or firmware, which embodies any one or more of the methodologies or functions described herein. The instructions can also reside, completely or at least partially, within the memory 704, processor(s) 702, and/or communication interface(s) 718 during execution thereof by the network equipment 700. The memory 704 and the processor(s) 702 also can constitute machine readable media 722.

The various techniques described herein may be implemented in the context of computer-executable instructions or software, such as program modules, which are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method comprising:

receiving, at a mobility management entity (MME) of a cellular communication network, a network access request to enable user equipment access to the cellular communication network;

retrieving, by the MME, charging characteristics (CC) information associated with the user equipment, wherein the CC information indicates whether collocated serving gateways (SGWs) and packet gateways (PGWs) are applicable to enable the user equipment access to the cellular communication network; and in response to the CC information indicating that collocated SGWs and PGWs are applicable to enable the user equipment access to the cellular communication network:

generating, by the MME, a domain name service (DNS) query comprising a request for SGW identification information associated with one or more collocated SGWs that are available to enable the user equipment access to the cellular communication network, wherein the one or more collocated SGWs are each collocated with a PGW;

receiving, by the MME, a response to the DNS query, the response comprising the SGW identification information;

identifying, by the MME, based at least in part on the SGW identification information, a collocated SGW and a corresponding collocated PGW to enable the user equipment access to the cellular communication network; and using, by the MME, the collocated SGW and the corresponding collocated PGW to enable the user equipment access to the cellular communication network.

2. The computer-implemented method of claim 1, wherein retrieving the CC information comprises requesting the CC information from a home subscriber service (HSS).

3. The computer-implemented method of claim 1, wherein the DNS query comprises the CC information and a tracking area code (TAC) which is selected by the MME based at least in part on the CC information.

4. The computer-implemented method of claim 3, wherein the TAC is selected by the MME based at least in part on a received TAC which is received along with the network access request.

5. The computer-implemented method of claim 1, further comprising:

generating, by the MME, a supplemental DNS query, wherein the supplemental DNS query comprises a request for PGW identification information associated with a collocated PGW that is available to enable the user equipment access to the cellular communication network; and receiving, by the MME, a supplemental response to the supplemental DNS query, the supplemental response comprising the PGW identification information;

wherein identifying, by the MME, the collocated SGW and the corresponding collocated PGW is based at least in part on the SGW identification information and the PGW identification information.

6. The computer-implemented method of claim 5, wherein identifying, by the MME, the collocated SGW and the corresponding collocated PGW comprises performing a name matching process to match at least portions of the SGW identification information with at least portions of the PGW identification information.

7. The computer-implemented method of claim 5, wherein the supplemental DNS query identifies an access point name (APN) requested by the user equipment.

8. The computer-implemented method of claim 1, wherein the collocated SGW and the corresponding collocated PGW are collocated in a same market of multiple different markets served by the cellular communications network, or on a same node of multiple different nodes operated by the cellular communications network.

9. A system comprising:

a processor, a network interface, and non-transitory memory storing instructions executed by the processor to perform actions including:

receiving, at a mobility management entity (MME) of a cellular communication network, a network access request to enable user equipment access to the cellular communication network;

retrieving, by the MME, charging characteristics (CC) information associated with the user equipment, wherein the CC information indicates whether collocated serving gateways (SGWs) and packet gateways (PGWs) are applicable to enable the user equipment access to the cellular communication network; and in response to the CC information indicating that collocated SGWs and PGWs are applicable to enable the user equipment access to the cellular communication network:

generating, by the MME, a domain name service (DNS) query comprising a request for SGW identification information associated with one or more collocated SGWs that are available to enable the user equipment access to the cellular communication network, wherein the one or more collocated SGWs are each collocated with a PGW;

receiving, by the MME, a response to the DNS query, the response comprising the SGW identification information;

identifying, by the MME, based at least in part on the SGW identification information, a collocated SGW and a corresponding collocated PGW to enable the user equipment access to the cellular communication network; and using, by the MME, the collocated SGW and the corresponding collocated PGW to enable the user equipment access to the cellular communication network.

10. The system of claim 9, wherein retrieving the CC information comprises requesting the CC information from a home subscriber service (HSS).

11. The system of claim 9, wherein the DNS query comprises the CC information and a tracking area code (TAC) which is selected by the MME based at least in part on the CC information.

12. The system of claim 11, wherein the TAC is selected by the MME based at least in part on a received TAC which is received along with the network access request.

13. The system of claim 9, further comprising:

generating, by the MME, a supplemental DNS query, wherein the supplemental DNS query comprises a request for PGW identification information associated with a collocated PGW that is available to enable the user equipment access to the cellular communication network; and receiving, by the MME, a supplemental response to the supplemental DNS query, the supplemental response comprising the PGW identification information;

wherein identifying, by the MME, the collocated SGW and the corresponding collocated PGW is based at least in part on the SGW identification information and the PGW identification information.

14. The system of claim 13, wherein identifying, by the MME, the collocated SGW and the corresponding collocated PGW comprises performing a name matching process to match at least portions of the SGW identification information with at least portions of the PGW identification information.

15. The system of claim 13, wherein the supplemental DNS query identifies an access point name (APN) requested by the user equipment.

16. The system of claim 9, wherein the collocated SGW and the corresponding collocated PGW are collocated in a same market of multiple different markets served by the cellular communications network, or on a same node of multiple different nodes operated by the cellular communications network.

17. Non-transitory computer-readable storage medium storing computer-readable instructions, that when executed by a processor, cause the processor to perform actions comprising:

receiving, at a domain name server (DNS) of a cellular communications network, a DNS query from a mobility management entity (MME), the DNS query comprising:

a request for one or more internet protocol (IP) addresses associated with one or more collocated serving gateways (SGWs), wherein the collocated SGWs are collocated with corresponding collocated packet gateways (PGWs), and wherein a collocated SGW of the collocated SGWs can be selected for use by the MME to enable network access by user equipment;

a tracking area code (TAC) that identifies a tracking area associated with the user equipment; and charging characteristics (CC) information associated with the user equipment;

identifying, by the DNS in response to the DNS query, the one or more IP addresses, wherein identifying the one or more IP addresses is based on the TAC and the CC information; and returning, by the DNS, the one or more IP addresses to the MME.

18. The non-transitory computer-readable storage medium of claim 17, wherein the actions further comprise:

receiving a supplemental DNS query at the DNS, wherein the supplemental DNS query comprises a request for PGW identification information associated with a collocated PGW that is available to enable the user equipment access to the cellular communication network, wherein the collocated PGW is collocated with at least one of the of the collocated SGWs;

identifying, by the DNS in response to the supplemental DNS query, the collocated PGW; and returning, by the DNS, an identification of the collocated PGW to the MME.

19. The non-transitory computer-readable storage medium of claim 18, wherein the supplemental DNS query identifies an access point name (APN) requested by the user equipment, and wherein the collocated PGW is associated with the APN.

20. The non-transitory computer-readable storage medium of claim 17, wherein the CC information is associated with a subscription profile of a subscription associated with the user equipment.

* * * * *